Patented Jan. 29, 1924.

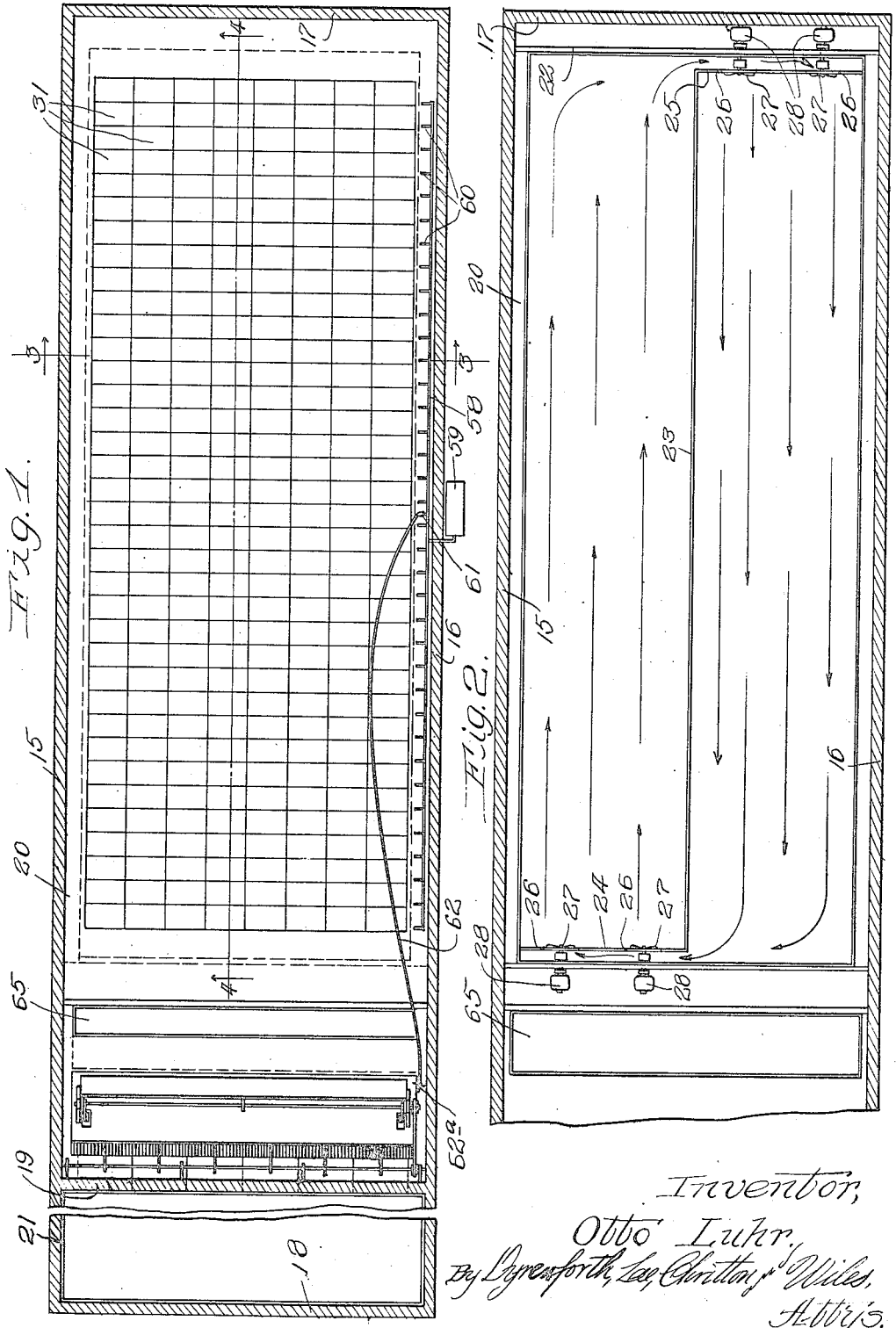

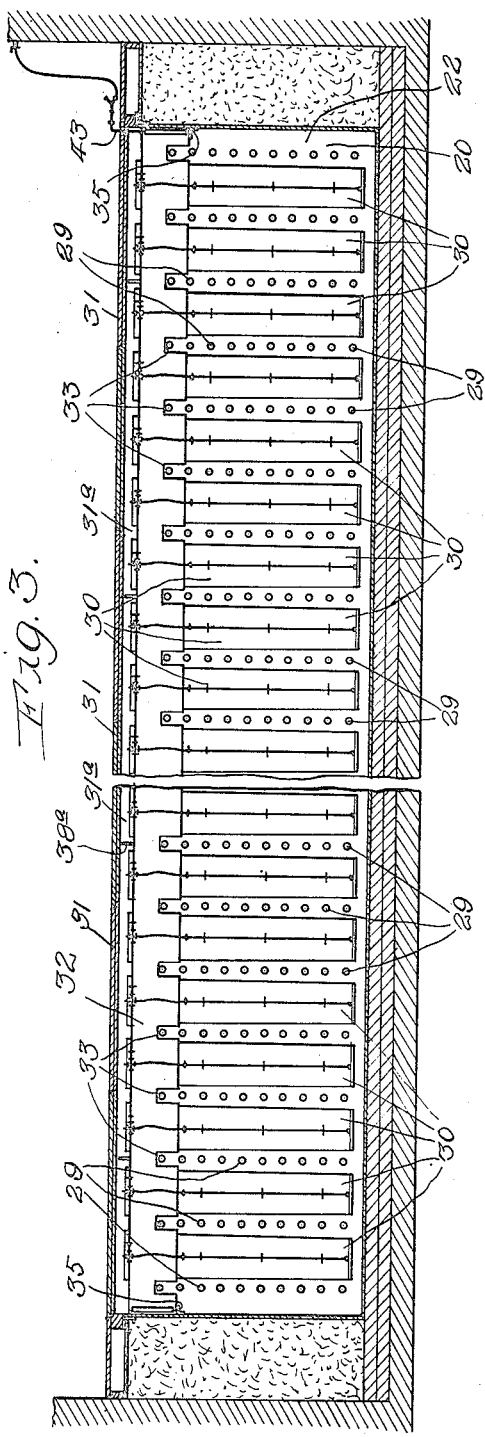

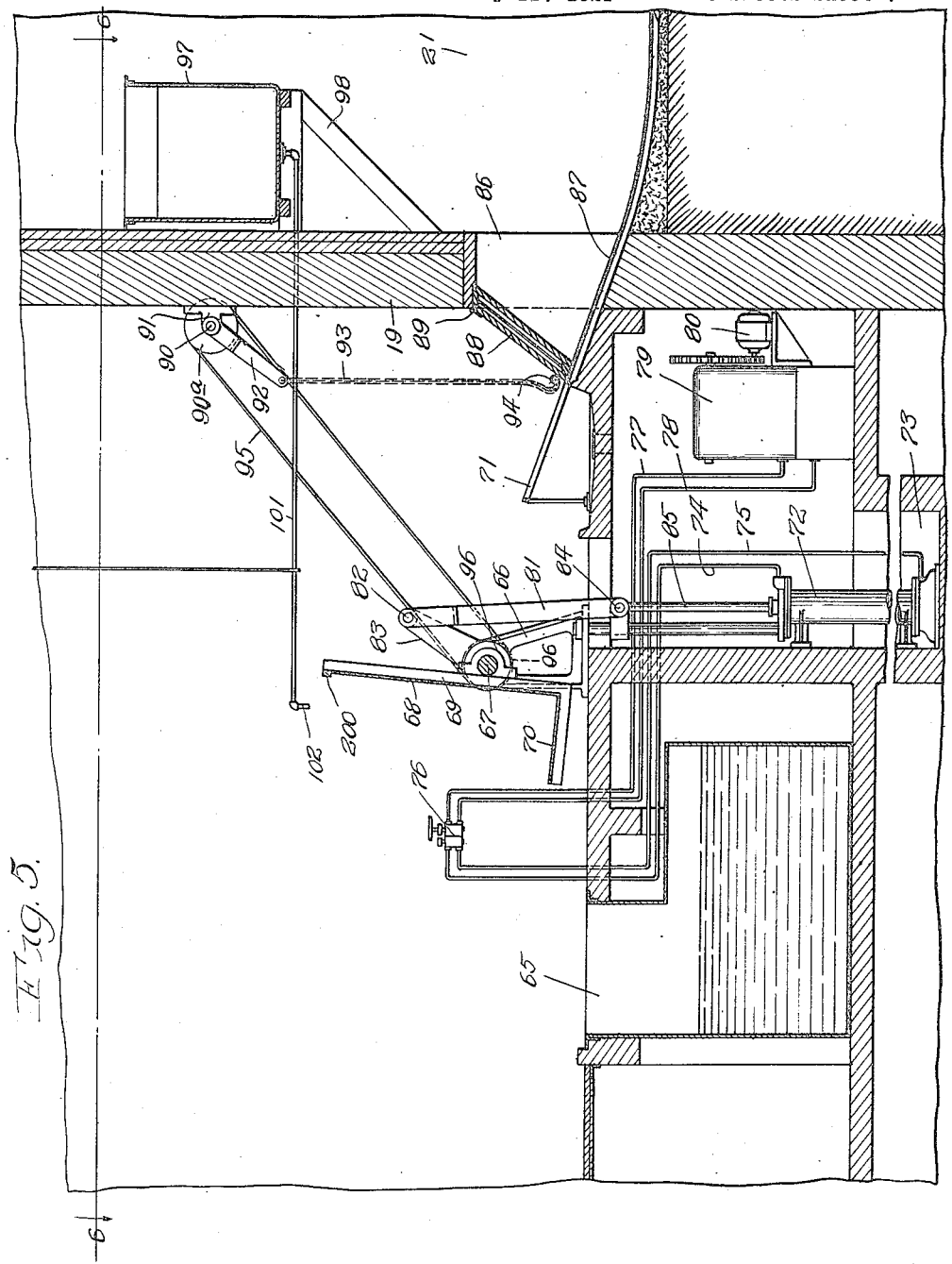

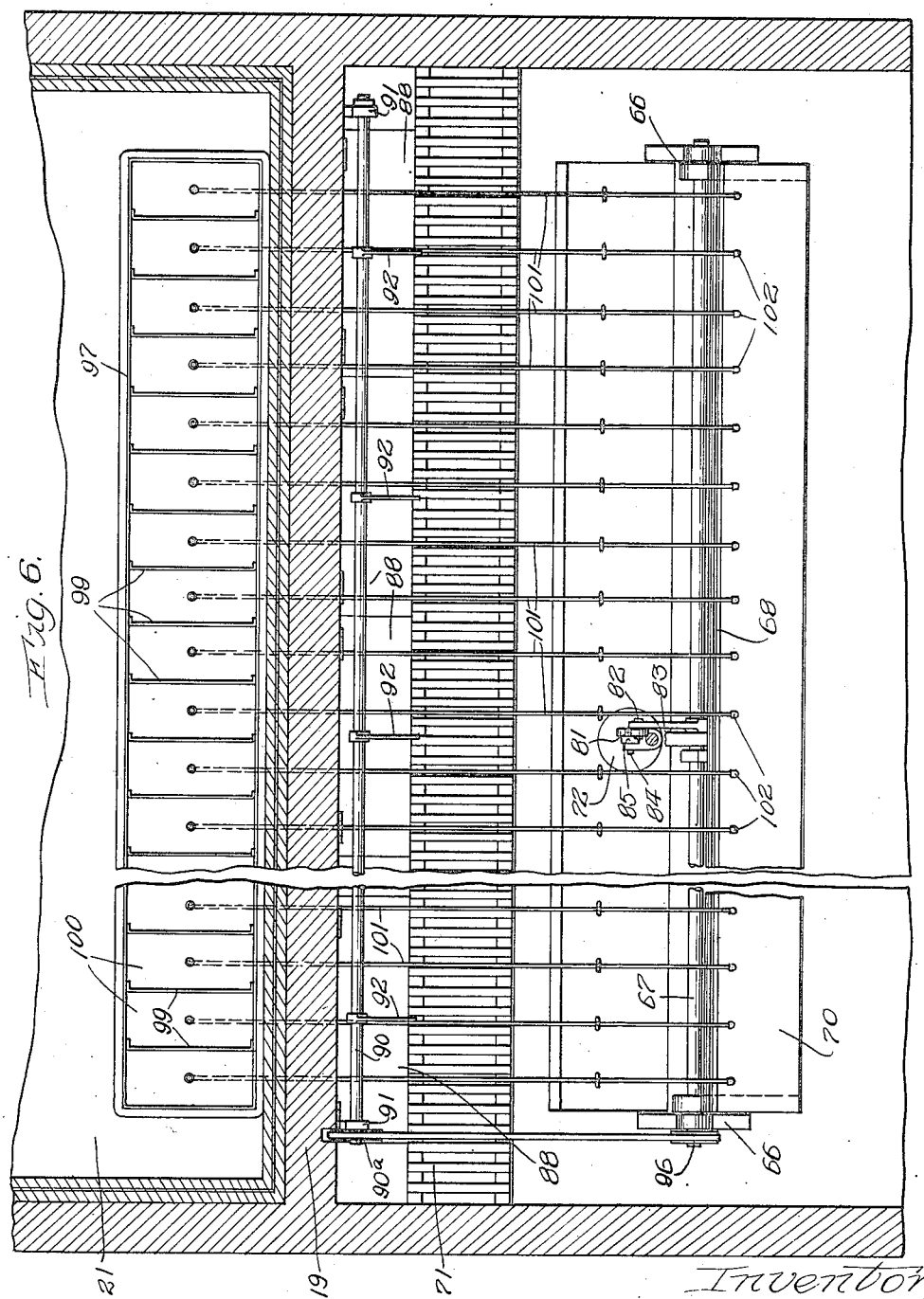

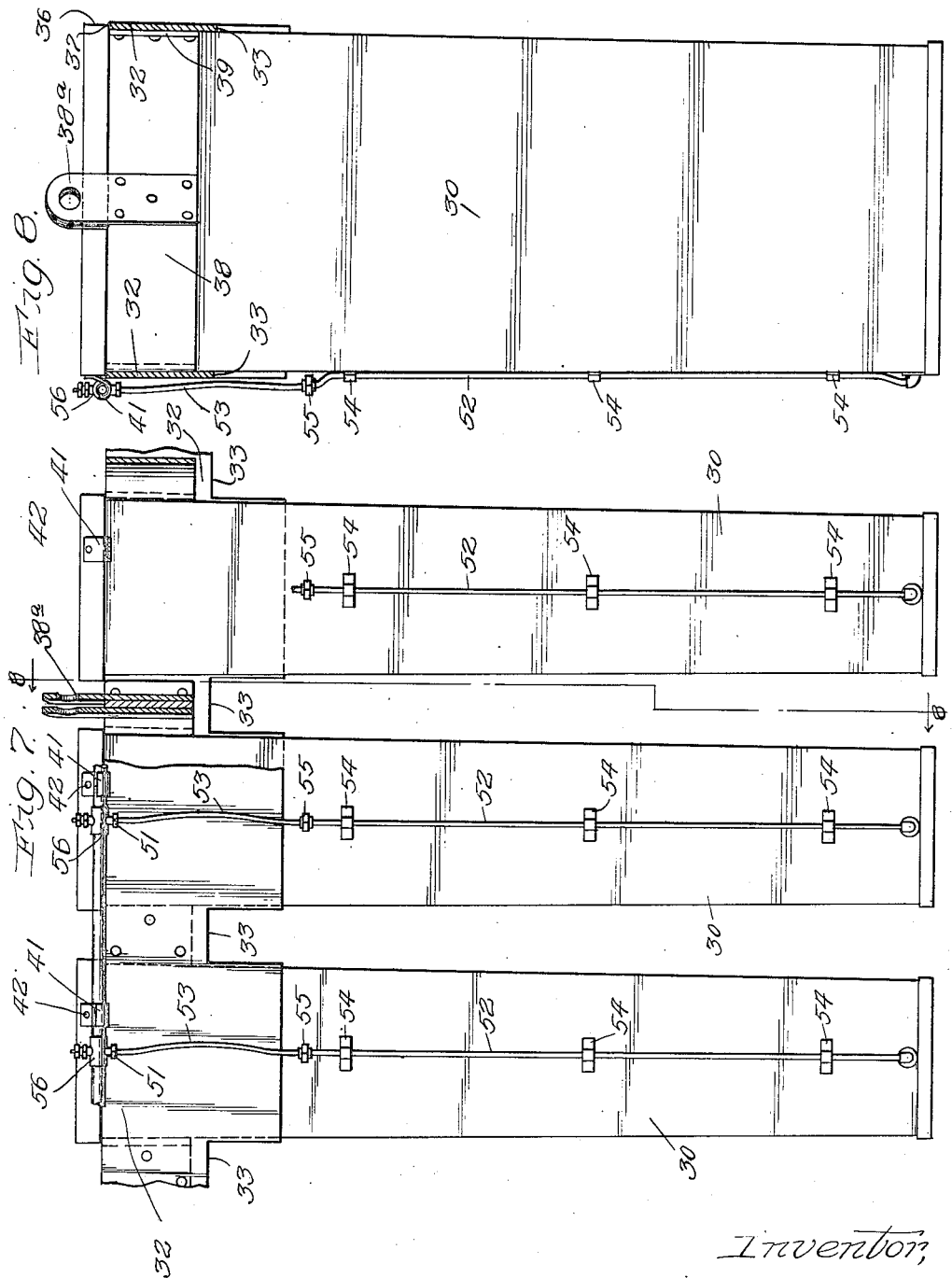

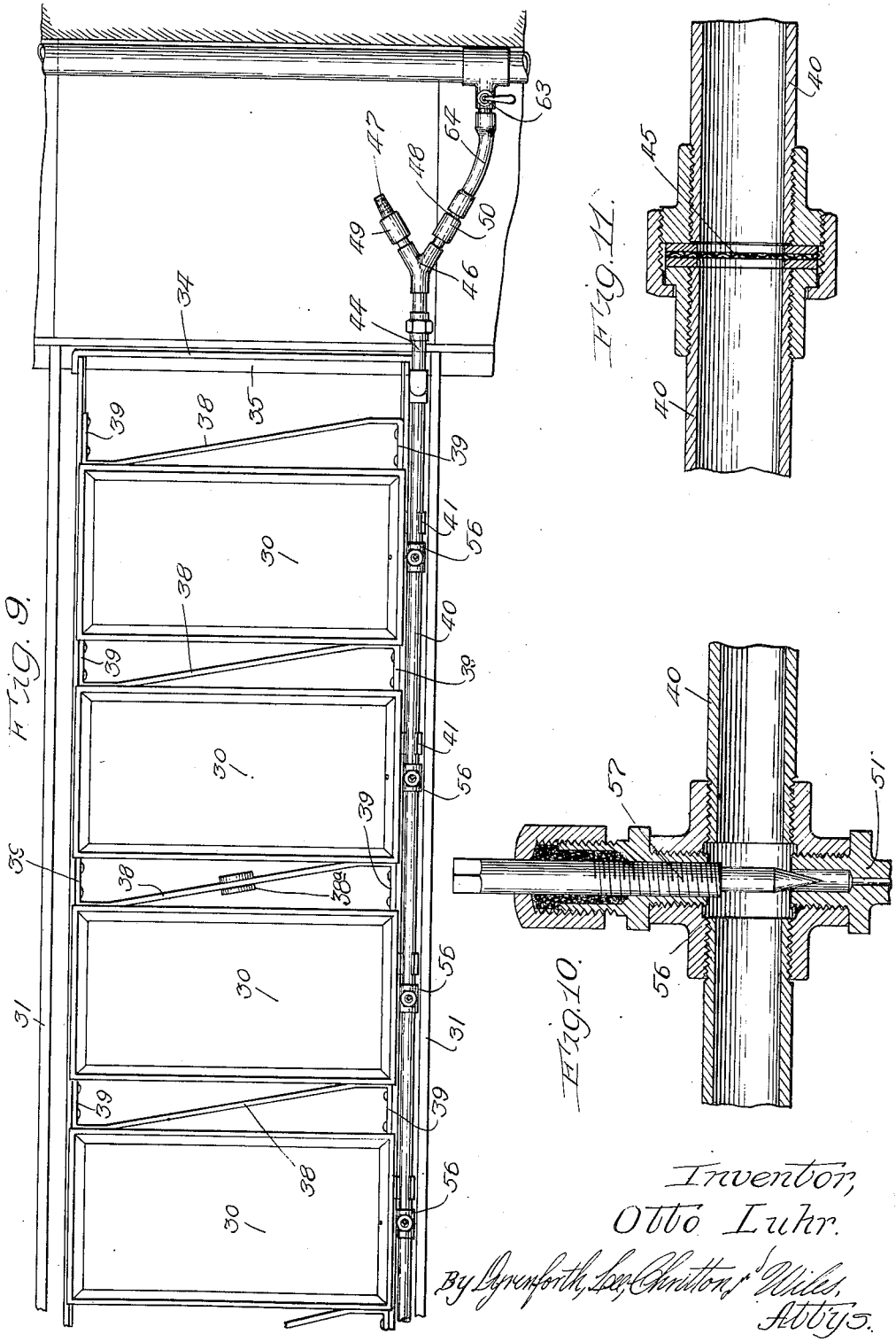

1,481,844

UNITED STATES PATENT OFFICE.

OTTO LUHR, OF CHICAGO, ILLINOIS, ASSIGNOR TO LUHR & FRIEDL, OF CHICAGO, ILLINOIS, A PARTNERSHIP FIRM COMPOSED OF SAID OTTO LUHR AND HERMAN FRIEDL.

ART OF MANUFACTURING ICE.

Application filed July 11, 1921. Serial No. 483,938.

*To all whom it may concern:*

Be it known that I, OTTO LUHR, a citizen of the United States, residing at Chicago, in the county of Cook and State of Illinois, have invented a new and useful Improvement in the Art of Manufacturing Ice, of which the following is a specification.

My invention relates more particularly to ice-making apparatus of the type employing a tank containing a fluid, as for example brine, cooled by artificial refrigerating means, and cans for receiving the water to be frozen into cakes, extending into the brine. As to certain features of my invention, it relates to ice-making apparatus of the character stated, further characterized by the cans being removable from the brine and transportable to a point of dumping, after which they are again charged with water and returned to place in the brine-tank for freezing the contents of the cans. As to other features it relates particularly to the forming of the ice cakes from raw water, as distinguished from distilled water, and requiring for the production of clear ice, the agitation of the water during its subjection to a freezing temperature.

It may be stated as a premise to the following description that as apparatus of the general character stated, has been hitherto provided, the workmen have been required to perform a large number of operations in the withdrawal of the cans from the brine-tank, this being performed by the use of a crane, and in the coupling and uncoupling of the air-line to the cans, and this results in relatively large expense. Furthermore as apparatus has hitherto been constructed there is great likelihood of the operator heating the water in the thawing-tank to such a degree as to cause cracking of the ice, especially where there has been an accumulation of ice-filled cans, due to the small tanks commonly employed.

My primary object, generally stated is to provide improvements in ice-making plants of the character stated, whereby the cost of manufacturing ice will be greatly reduced primarily by reducing the amount of labor required. More especially, certain of my objects are to reduce the number of operations required in the drawing of the cans from the brine-tank, and in the coupling and uncoupling of the air-lines to the cans; to provide for the desired submergence of the cans in the brine without requiring any manipulation by the workmen, of parts especially for this purpose; to provide a simple and novel arrangement whereby the air connectors for the several cans may be "blown" at will and expeditiously to remove such accumulations as may occur therein; to provide for the ready detection, and in a manner not to interfere with the expeditions carrying on of the various steps of the operation, of any interference with the desired flow of air to the cans; to provide novel, simple and improved means for the dumping of the ice-cakes from the cans and their discharge from the room in which the cans are dumped; to provide an arrangement wherein the ice-cakes may be thawed from the cans, by use of a medium relatively cool as compared with the hot-water hitherto used, and other objects as will be manifest from the following description.

Referring to the accompanying drawings:—

Figure 1 is a plan view, with certain parts broken away, of an ice-making apparatus embodying my improvements, the walls of the building in which the apparatus is housed, being shown in section. Figure 2 is a similar view with substantially all of the apparatus removed, and showing, in plan, the brine-tank and circulating means therefor and also the dipping-tank. Figure 3 is a broken, enlarged, section taken at the line 3—3 on Fig. 1 and viewed in the direction of the arrows. Figure 4 is a broken, enlarged, section taken at the line 4—4 on Fig. 1 and viewed in the direction of the arrows. Figure 5 is a longitudinal sectional view of one end of the installation, showing the dipping-tank, the dumping mechanism and the can refilling portion of the structure. Figure 6 is a plan view of the portion of the structure shown in Fig. 5. Figure 7 is an enlarged broken view in elevation, with certain parts sectioned, of one of the batteries of cans employed. Figure 8 is a section taken at the line 8—8 on Fig. 7 and viewed in the direction of the arrows. Figure 9 is an enlarged, broken plan view of a portion of one of the batteries of cans showing it as located in the brine-tank, and the air-supply means for these cans connected with the air line. Figure 10 is a sectional view taken through one of the connections between the main air-pipe for a battery of cans and one of the cans; and Figure 11, a longitudinal section taken through the screen-equipped portion of the main air feed-pipe for a battery of cans.

As is customary in ice-making plants, the apparatus is located in a building, the walls of which are represented at 15, 16, 17 and 18, a transverse wall 19 dividing the space within the building into two compartments 20 and 21, the compartment 20 containing in the particular construction shown substantially all of the ice-making apparatus, and the compartment 21 representing that portion of the building into which the ice is discharged preferably for transfer to another point.

The compartment 20 is provided with a brine-tank represented at 22, this brine-tank, employed in apparatus of this general type, in accordance with common practice containing a partition 23 extending lengthwise thereof and having the angularly disposed portions 24 and 25 spaced from the ends of the tank 22, with openings 26 in the walls 24 and 25, adjacent to which propellers 27 and shown as operated by electric motors 28, are positioned, through which openings the brine is free to circulate under the action of the propellers, the arrangement shown permitting of the circulation of the brine as illustrated by the arrows in Fig. 2.

Further in accordance with common practice, the brine-tank 22 contains a series of parallel pipe-coils which extend lengthwise of the tank 22, and are located a distance apart slightly greater than the width of the cans, hereinafter described, at their narrowest dimension, these series of pipe-coils being represented at 29. These pipe-coils which extend to within a short distance of the top of the brine-tank 22 are provided for the circulation therethrough of any suitable refrigerating medium such as ammonia supplied thereto in any suitable manner, as is common in constructions of this general character for maintaining the brine at the desired temperature for freezing the water in the cans hereinafter described.

The cans in which the ice is formed are represented at 30, these cans being provided in a series of rows, the rows extending crosswise of the length of the compartment 20, it being preferred that each row comprise twenty-four of the cans 30, these cans extending into the brine in the tank 22 and located respectively in the spaces provided between the pipe-coils 29 as shown more particularly in Fig. 3, the arrangement shown also involving, as is common practice, the provision of covering means for the tank 22 formed of sections 31 arranged in a series of rows as shown in Fig. 1 to permit of access to the interior of the brine-tank at any point thereof without uncovering the remainder of the tank. The tank is shown as provided with a series of stringers 31ª arranged in parallel relation near the top thereof and serving as supports for the cover sections 31 in accordance with common practice.

In the particular arrangement shown, and in accordance with the preferred embodiment of my invention the cans 30 forming each transverse row thereof, are so related to other parts, hereinafter described, that each row of cans constitutes a battery which may be removed from position in the brine-tank and transferred to the thawing-tank, and thence to the dumping means, as a unit, and returned, as a unit, to position in the brine-tank, this being provided for in the particular construction shown, by providing at each side of each transverse row of cans, a bar 32 which extends crosswise of the tank 22 and of the pipes 29, these bars containing downwardly opening notches 33 at which these bars occupy straddling relation to the upper portions of the refrigerating pipes 29 as illustrated in Fig. 3. Each pair of bars 32, for the transverse rows of cans, are connected together at their opposite ends by cross bars 34, the bars 32 and 34 being preferably of such thickness, and sufficiently rigidly connected together, in any suitable manner, as to provide a rigid framework, through the medium of which the several batteries of cans referred to may be bodily lifted from the brine-tank and returned thereto. The frameworks, cans and other parts carried thereby, as hereinafter described, are preferably of such weight that when the cans are charged with water to be frozen therein for forming the cakes of ice, the cans will be submerged to the desired depth in the brine, and as a desirable means for positioning the cans in the brine at the desired depth, I provide the inwardly projecting ledges 35 on the side walls of the tank 22, these ledges being shown as comprising angle irons secured to the side walls and upon which the frameworks rest.

The cans 30 constructed preferably of relatively thin sheet metal in accordance with common practice taper toward their lower ends as shown in Figs. 7 and 8, their upper edges being provided with reinforcing bands at their outer surfaces and represented at 36, these bands projecting outwardly from the cans and forming downwardly facing shoulders surrounding the cans. The frameworks referred to and formed of the bars 32 and 34 are also provided at intervals with crosspieces 38, formed of substantially Z-shaped bars connected at their flanged ends 39 to the inner surfaces of the opposed bars 32 and so disposed that a plurality of openings through the frameworks are provided for the several cans 30 the cans being supported at opposite sides thereof at the shoulder portions 37, on the frameworks, as shown in Fig. 8. Certain of the bars 38 are provided with upwardly extending eyes 38ª to serve as points of connection for the hooks provided on the depending elements of cranes commonly employed for conveying the cans in apparatus of this general character.

Each battery of cans is provided with a main air-pipe represented at 40 and shown as supported in stirrups 41 secured, as indicated at 42, to the upper edge portions of the cans, this pipe extending practically the entire length of the battery of cans and being formed at one end with an upturned portion 43 adapted to extend upwardly through an opening in the cover portion of the tank 22, this upturned portion having extending therefrom a substantially horizontal portion 44 containing a removable and replaceable screen 45 and terminating in a branch coupling 46, the branches of which connect with pipes 47 and 48 containing check-valves which open toward the cans, the casings of these valves being represented at 49 and 50 respectively. The extremities of the pipes 47 and 48 are provided for connection with air-conducting-pipes hereinafter referred to. The pipe 40 adjacent each can 30 is equipped with a depending branch pipe 51, the lower end of which opens into the adjacent can 30 at a point closely adjacent to the bottom wall of the can. The pipes 51 are preferably each formed of two sections, a lower section 52 and an upper section 53, the section 52 being supported on the can through the medium of straps 54 secured thereto in any desirable manner, as for example by soldering them in position on the can, and the section 53, preferably formed of readily deflectable material as for example copper, being connected at its lower end with the upper end of the pipe 52 at a union 55 and at its upper end with a coupling 56 interposed in the pipe 40 and provided with a needle valve 57 of any suitable construction, such as that shown in Fig. 10 and through the medium of which communication between the pipe 40 and the pipe 51 may be controlled, to regulate the amount of air supply to the pipe 51.

It may be here stated that the purpose of the air-pipes referred to is to supply air to the interiors of the cans thereby to effect a degree of agitation of the water in the cans 30 sufficient to insure the production of clear ice, the air, for this purpose, in the particular construction illustrated, being supplied from an air-pipe 58 extending lengthwise of the compartment 20 and supplied with the desired amount of air pressure, as from a compressor of any desirable construction, represented at 59, the pipe 58 being provided at intervals along its length with branch pipes 60 corresponding in number to the number of transverse rows of cans 30, and also provided with a branch pipe 61 intermediate its ends equipped with a flexible hose connection 62 having a manually controlled valve of any desirable construction represented at 62ª. The branch pipes 60 are each provided with a valve 63, these branches being provided for connection with the several pipes 40 at the portions 48 of the latter, as by means of flexible pipe connections one of which is represented at 64. The flexible pipe 62 is provided for connection, successively, with portions 47 of the pipes 40 for a purpose hereinafter described.

The compartment 20 contains at one end thereof, the left hand end in Fig. 1, a thawing-tank provided for the purpose of receiving in succession, the batteries of cans referred to after the water has been frozen therein to form the cakes of ice, in which tank the bond between the ice cakes and the interior surfaces of the cans, is broken, to permit of the discharge of the cakes of ice from the cans by gravity, in the dumping operation hereinafter referred to. The thawing-tank referred to is represented at 65, this tank extending transversely of the compartment 20 and being preferably of the cross sectional shape as shown in Fig. 5 to afford a relatively large body of water into which the cans are to be introduced, this water, which is heated to the desired degree, being preferably of a volume equal to substantially four times the contents of the cans.

Located beyond the dipping, or thawing, tank 65, is a dumping mechanism adapted to receive the cans of ice, the cakes of which have been thawed therefrom as stated, and move the cans to a position in which the cakes of ice may slide therefrom to a suitable point of discharge. The dumping mechanism shown comprises the standards 66 secured to, and arising from, the floor of the compartment 20 and in which is journalled a shaft 67, this shaft being rigidly connected with a holder represented at 68 for receiving the battery of cans 30, this holder being preferably of angle shape in cross section as represented and affording the angularly disposed sections 69 and 70 which occupy the positions represented in Fig. 5, in the normal condition of the apparatus namely, when in a position to receive a battery of the cans which rest upon the portion 70 of the holder, the holder being adapted, by rotating the shaft 67, to rotate in clockwise direction in Fig. 5 to a position in which the portion 69 of the holder inclines downwardly to the right in Fig. 5 in which position the ice cakes in the cans located in the holder, will slide therefrom and discharge upon a grating represented at 71. The mechanism shown for operating the shaft 67 comprises hydraulically-operated piston and cylinder mechanism, the cylinder of which is represented at 72 and is located in a pit 73, the opposite ends of this cylinder being equipped with pipes 74 and 75 which lead to a valve mechanism 76 of any suitable construction for controlling the admission of the operating fluid, which may be oil or any other suitable liquid to, and the exhaustion of the liquid from, the opposite ends of the cylinder, under the control of the operator who manipulates this valve, the liquid being shown as supplied through pipes 77 and 78 from a hydraulic pump 79 which may be of any desirable construction and shown as operated by a motor 80. The admission of the liquid to the cylinder 72 is shown as strictly manually controlled, as distinguished from automatically controlled, and the arrangement shown merely operates to permit the operator to rock the shaft 67 in opposite directions at will, the connections for thus operating the shaft comprising a link 81 pivotally connected at its upper end, at 82, to the extremity of a crank 83 rigidly secured to the shaft 67, and at its lower end pivotally connected, at 84, with the upper end of the piston rod 85 of the piston and cylinder mechanism referred to.

The partition 19 is shown as containing an opening 86 through which it is intended the cakes of ice discharged from the cans by the dumping mechanism referred to, discharge into the compartment 21, this opening containing a guideway or chute 87 which connects at its upper end with the lower end of the grating 71 and inclines downwardly into the compartment 21. In order to close communication between the compartments 20 and 21, except during the operation of discharging ice from the compartment 20 into the compartment 21, I provide removable closure means shown as formed of a series of doors 88 hingedly connected at their upper ends to the wall 19, as indicated at 89 and adapted to rest, at their lower ends, in closed position, against the upper surface of the chute 87. Mechanism is provided whereby the doors 88 are automatically raised to open condition for permitting of the passage of the ice cakes through the opening 86 into the compartment 21, these means, in the particular construction shown, comprising a shaft 90 journalled in brackets 91 on the wall 19 and equipped with crank arms 92 to the outer ends of which the upper ends of connectors 93 shown as chains, are connected, the lower ends of these connectors being connected with the lower ends of the doors 88, as through the medium of the eyes 94. The shaft 90 is shown as provided with a sprocket 90ª adapted to be driven through the medium of a sprocket-chain 95 engaging a sprocket-wheel 96 rigidly secured to the shaft 67. The parts of the construction just described are so arranged and proportioned that when the dumping holder 68 is in the position shown in Fig. 5, the doors 88 will be in closed position, but during the rotation of the holder 68 to a position in which the ice is free to discharge by gravity from the cans onto the grating 71, the doors 88 will be raised into a position in which they offer no obstruction to the discharge of the ice into, and through, the opening 86. Thus the doors 88 are caused to remain open only for such a period of time as will permit of the discharge of ice through the opening 86, and thus air interchange between the compartments 20 and 21 is reduced to the minimum.

The apparatus illustrated also comprises means for filling the cans with water to the desired amount for producing blocks of ice of the desired size, these means comprising a tank 97 supported on brackets 98 in the compartment 21 at a point above that occupied by the upper extremities of the cans 30 when located on the holder 68, this tank containing a series of partitions 99 dividing the tank 97 into a series of compartments 100 corresponding in number with the number of cans forming each battery thereof, each of these compartments communicating with an outlet pipe 101 the depending discharge ends 102 of which are located in a position to extend directly above the respective cans of the battery thereof when supported on the holder 68 in the position shown in Fig. 5. The compartments 100 would be supplied with water, from which the ice cakes are to be formed, in any suitable way and from any desirable source, it being preferred that means (not shown), but which may be of the kind commonly employed in apparatus of this character, be provided for filling each compartment 100 with the amount of water desired to be discharged into the cans 30 whereby a measured quantity of water is discharged into each can, and any suitable control (not shown) may be provided for controlling the flowing of the water from the several compartments 100 into the cans, such as for example that commonly provided in present-day installations.

The operation of the apparatus is as follows: It may be stated as a premise to a description of the operation that the batteries of cans are withdrawn from the brine-tank in succession, it being designed that one battery of cans be withdrawn from the brine-tank, thence passed onto the thawing tank, thence carried to the dumping holder for discharging the cakes of ice therefrom, the cans being charged with water at this point, and then returned to the brine-tank, before any of the other rows of cans are disturbed, and after this operation has been completed the next row of cans similarly operated on, and so on throughout the series of rows until all of the cans thereof have been emptied of the cakes of ice contained therein, are charged with water and replaced in the brine-tank, the laying out of an apparatus of this kind preferably contemplating continuous operation thereof and upon the basis of the period required for forming the cakes of ice, corresponding with the length of time required to accomplish the dumping and refilling with water, of all of the rows of cans. The withdrawing of a battery of the cans is effected by engaging therewith at the eyes 68ª, the depending hoisting hook-equipped elements of the crane usually provided in ice-making installations and which would be located in the upper portion of the compartment 20 and be movable in the latter in a substantially horizontal plane, and in the operation of the crane, to hoist the elements referred to, the can-supporting framework and with it the several cans forming the battery thereof supported by this framework would be elevated. The crane is then operated to carry the battery of cans to the thawing-tank 65, the operator first having disconnected the pipe 40 from the pipe 58 at the section 64, the valve 63 having been previously closed and the flexible pipe 62 having been preliminarily attached to the portion 47 of the pipe 40 and its valve 62ª opened. The battery of cans removed from the brine as stated is then positioned, by the crane, over the inlet of the tank 65 and lowered by the crane into a position wherein the thawing water in the tank extends above the cakes of ice in the cans, but below the tops of the latter, the cans being permitted to remain in this tank until the ice has been sufficiently thawed to break the bond between the ice and the cans, whereupon the crane is again actuated to lift the battery of cans and position them on the holder 68, the holder occupying the position shown in Fig. 5. The hoisting hooks of the crane would then preferably be disengaged from the eyes 38ª, and the valve 76 then operated to permit air to enter the upper end of the cylinder 72 and force the piston therein downwardly with the result of rocking the holder 68 in clockwise direction in Fig. 5 to a position in which it registers with the upper end of the grating 71 and inclines downwardly, thereby permitting of the sliding by gravity of the cakes of ice from the cans and onto the grating 71. In the operation of the holder 68 as stated, the doors 88 are raised and thus the cakes discharge from the cans, upon the grating 71 and thence slide along the slide 87 through the openings 86 into the compartment 21, the stop provided at 200 on the holder 68 serving to prevent the battery of cans from becoming displaced on the holder 68 in the operation of the latter, as stated. Following the ice dumping operation referred to, the operator manipulates the valve 76 to permit air to enter into the lower part of the cylinder 72 and exhaust from the upper end thereof, for moving the holder 68 to normal position (Fig. 5) in which the cans extend substantially upright.

The operator then operates the control (not shown, but hereinbefore referred to) for the discharge of the water from the compartments 100 into the battery of cans in the holder 68, to effect the charging of the cans with water. It may be here stated that the supplying of the air to the cans during the charging of the latter with water is an advantage as thereby any stoppage in the air-pipes may be quickly determined and the blowing out of the accumulations in the pipes quickly effected, and where repairs are discovered to be necessary such may be expeditiously effected, as compared with the case where the cans have been introduced into the brine-tank before the air connections are made which latter practice is the one now commonly followed.

The battery of cans having been filled with water, the crane is again attached thereto and the battery of cans carried by the crane to the portion of the brine-tank from which the cans were removed, and the cans then lowered to position in the brine. The main air-pipe 40 of this battery of cans is then connected at its portion 48 with the air-line-pipe 58, by means of the adjacent coupling-pipe 64, the valve 63 thereof then opened, and thereafter the valve 62ª closed and the pipe 62 disconnected from the pipe 40. The pipe 62 is then connected with the next row of cans in which the ice cakes are formed, the valve 62ª opened, the hose 64 disconnected and the valve 63 closed, and this battery of cans then lifted from the brine-tank, carried to the thawing-tank and thence to the holder 68 where they are dumped and afterwards refilled with water, whereupon the charged cans are returned to position in the brine-tank, the air-pipe 40 thereof connected with the adjacent hose-section 64, the valve 63 therefor opened, the valve 62ª closed and the pipe 62 disconnected from this pipe 40, all as particularly described in connection with the first row of cans operated on; and so on throughout the entire series of rows of cans, and by the time the last row of cans has been dumped and returned to the brine-tank, charged with water, the first row of cans is ready to be again dumped and the operations stated are continued. In connection with the feature of employing a relatively large thawing-tank as stated, it may be stated that it is necessary to avoid subjecting the cans containing the blocks of ice, to excessive heat, as thereby cracking of the ice often results. Furthermore, while it is customary to lay out apparatus of the type referred to so that more or less prolonged intervals of time elapse between the operations of withdrawing the cans from the brine, which gives a relatively long time for subjection of the cans to the thawing water and which may therefore be maintained comparatively cool as compared with the excessive heat above referred to, it often times happens that no pulling of the cans from the brine occurs over many hours of time and consequently a large proportion of the cans contain ice which it is desired be removed therefrom as quickly as possible, and this shortens up the time that the cans are allowed to remain in the thawing-tank, with the result, in apparatus as hitherto provided, that the operator in order that the thawing water will not be rendered too cool for use, effects the heating of the water to a high degree, often times heating it to such a degree that cranking of the ice occurs. By providing the large tank as stated which would preferably be equipped with a thermostatic device cooperating with the heating medium as for example steam, and which may be set to prevent the temperature of the water exceeding any predetermined degree, the batteries of cans may be thawed in relatively quick succession when this is desired, the steam for heating the water, under the control of the thermostat, serving to maintain the temperature of the water substantially uniform, the cooling effect on the water of the ice-filled cans introduced into it be relatively small, by reason of the large volume of water provided as compared with the cooling effect produced where the tank of thawing water is relatively small.

In accordance with the preferred manner of operating my improved apparatus, the supply of air to the various air-pipes 40 is rendered continuous, and this is of advantage at is tends to greatly minimize clogging of the air-pipes of the apparatus. In this connection it may be stated that this is of particular advantage as thereby the air-pipes may be arranged permanently on the cans without danger of water supplied to the exterior of the cans in the filling operation, freezing in these pipes, as the flow of air through these pipes at the time of introduction of the cans into the brine, renders these pipes clear of water.

It will be noted that the stress exerted on the battery of cans when suspended from the crane, is so directed that the cans themselves are not subjected to great stresses, inasmuch as the cans virtually hang in independently supported condition on the framework of which the bars 32 are parts, the stresses, so far as the cans themselves are concerned, being taken, by the bands 36, and this is of great advantage inasmuch as the cans are preferably made of relatively thin sheet metal. It will be understood, however, that if desired the Z bars 38 may be extended upwardly to overlap the opposed bands 36 and riveted thereto, if desired. The bars 32 not only perform the functions stated but also, by reason of their relatively great depth serve as stiffeners for the cans in the event that the latter are riveted to these bars, as for example adjacent the lower edges of the latter.

The provision of the needle valves, one for each can, is also an advantage as thereby the pipes leading therefrom into the interiors of the cans, may be subjected to a vigorous flushing with air, by opening these valves, to remove any accumulations in these pipes, these needle valves also permitting of the ready and easy control and regulation of the amount of air permitted to enter the bottom of each can.

In view of the fact that the cans are subjected to rapid changes in temperature, by reason of their removal from the brine-tank, the brine in which is of a temperature of about 12 to 15° F. above zero, and their introduction into the thawing-tank wherein the water will range, depending upon the setting of the thermostat, from about 80° F., where plenty of time is permitted for the thawing operation, to approximately 140° F. where the thawing is required to be effected rapidly, provision is made for permitting of the expansion and contraction of the cans without impairing the joints in the air-pipes. This is accomplished in the construction illustrated by providing the sections 53 of such metal that it will be deflected without becoming impaired, and providing the straps 54 of such size that these straps and the pipes 52 may have relative movement lengthwise of the cans. Furthermore, the soft metal pipes 53 also permit of the making of the connections between the pipe sections 53 and the couplings 56 without these parts being subjected to any undue strain.

In order to economize in room occupied by the various cans, it is desirable that they be placed in very close proximity to each other and thus the spaces provided between the tops of the cans are relatively narrow, and the portions of the bars 32 presented at these spaces are relatively short, but afford sufficient surface for the secure attachment thereto of the flanges of the Z bars which I find are very advantageously employed not only because of the fact that they may be securely riveted to the bars 32 but also because they form very desirable points of attachment for the hooks of the hoisting elements of the crane. It will be understood that where each can contains about 400 pounds of ice and each battery comprises a large number of these cans, as for example twenty-four, the entire battery is of great weight, and provision must be made, as hereinbefore described, for supporting this weight from relatively few points in a positive manner and by a relatively rigid construction.

The provision of the batteries of cans whereby each battery may be moved from place to place as stated, as a unit, each battery preferably comprising all of the cans of a transverse row, especially in connection with the feature of providing an arrangement, as described, whereby one connection only need be made to the air-line for supplying air to all of the air-pipes of the cans of a battery, which air-pipes are permanently secured to the battery of cans and are moved from place to place with the cans, very greatly reduces the amount of labor required in the drawing of the cans from the brine-tank, the thawing of the same, the dumping of the ice cakes therefrom, the refilling of these cans, and their return to position in the brine-tank, as compared with apparatus hitherto provided, and thus great savings may be effected by installing apparatus in accordance with my invention.

The number of cans constituting a battery thereof may be varied as desired. It is however desirable in many installations that each transverse row of cans constitute a battery formed into a unit, but where the conditions render it advisable each row of cans may be divided into as many batteries as desired.

While I have illustrated and described a particular construction embodying my invention, I do not wish to be understood as intending to limit it thereto as the same may be variously modified and altered without departing from the spirit of my invention.

What I claim as new, and desire to secure by Letters Patent is:

1. In ice-making apparatus, the combination of a refrigerating tank, a framework comprising bar-sections spaced apart and substantially Z-shaped bars extending across the space between said bar-sections and secured thereto at their angularly disposed end-portions, and a series of cans in which the ice-cakes are to be formed, engaging said framework and supported thereby and removable from, and replaceable in, the tank, as a unit.

2. In ice-making apparatus, the combination of a refrigerating tank, a framework comprising bar-sections spaced apart and substantially Z-shaped bars extending across the space between said bar-sections and secured thereto at their angularly disposed end-portions, and a series of cans in which the ice-cakes are to be formed, provided with outwardly extending shoulders at which they rest on said framework, said cans being removable from, and replaceable in, the tank, as a unit.

3. In ice-making apparatus, the combination of a refrigerating tank, a framework comprising bar-sections spaced apart and substantially Z-shaped bars extending across the space between said bar-sections and secured thereto at their angularly disposed end-portions, certain of said Z-shaped bars presenting apertured portions between their ends for engaging with the hoisting elements of a crane, and a series of cans in which the ice-cakes are to be formed, engaging said framework and supported thereby, and removable from, and replaceable in, said tank, as a unit.

4. In ice-making apparatus, the combination of a tank containing a plurality of series of refrigerating pipes each series extending substantially vertically and in spaced apart relation, a series of cans in which the ice-cakes are to be formed located in the spaces between said series of pipes, and supporting means engaging said cans and connecting them together to form a battery thereof, and through the medium of which said series of cans is supported, said means comprising bar-sections spaced apart and extending cross-wise of said pipes and containing notches in their lower edges at which they straddle said series of pipes, said cans being removable from, and replaceable in, said tank, as a unit.

5. In ice-making apparatus, the combination of a refrigerating tank, a battery of cans operatively connected together and removable from, and replaceable in, said tank, as a unit, the cans of said battery being spaced apart to permit of contact on all sides of each can with the refrigerant in the tank, a main air-pipe for connection with an air-supply, and branch pipes connecting with said main air-pipe and opening into the several cans for supplying air to the interiors thereof, said main air-pipe and said branch pipes being carried by said battery of cans and movable therewith in the transporting of the cans.

6. In ice-making apparatus, the combination of a refrigerating tank, a battery of cans operatively connected together and removable from, and replaceable in, said tank, as a unit, the cans of said battery being spaced apart to permit of contact on all sides of each can with the refrigerant in the tank, a main air-pipe for connection with an air-supply and branch pipes connecting with said main air-pipe and opening into the several cans for supplying air to the interiors thereof, said main air-pipe and said branch pipes being carried by said battery of cans and movable therewith in the transporting of the cans, and valves for controlling the flow of air into said branch pipes, respectively.

7. In ice-making apparatus, the combination of a refrigerating tank, a battery of cans operatively connected together and removable from, and replaceable in, said tank, as a unit, the cans of said battery being spaced apart to permit of contact on all sides of each can with the refrigerant in the tank, a main air-pipe for connection with an air-supply and branch pipes connecting with said main air-pipe and opening into the several cans for supplying air to the interiors thereof, said main air-pipe and said branch pipes being carried by said battery of cans and movable therewith in the transporting of the cans, and needle valves for controlling the flow of air into said branch pipes, respectively.

8. A can in which ice is to be formed, provided with an air-pipe connected at its upper end with the upper end of the can and at its lower end connected with the lower end of the can and opening into the latter, and straps on the can through which said pipe guidingly extends, said pipe being formed with a relatively flexible section disposed in deflected condition in the contracted condition of the can and moving toward straight condition in the expanding of the can.

9. In ice-making apparatus, the combination of a refrigerating tank, a battery of cans operatively connected together and removable from, and replaceable in, said tank, as a unit, a system of air-pipes carried by said battery of cans through which air is supplied to the interiors of the cans and movable therewith in the transporting of the cans, said system of air-pipes having a plurality of attaching portions for air-supply pipes.

10. In ice-making apparatus, the combination of a refrigerating tank, a battery of cans operatively connected together and removable from, and replaceable in, said tank, as a unit, a system of air-pipes carried by said battery of cans through which air is supplied to the interiors thereof and movable therewith in the transporting of the cans, said system of air-pipes having a plurality of attaching portions for a main air-supply, and check-valves in said attaching portions.

11. In ice-making apparatus, the combination of a refrigerating tank, a battery of cans operatively connected together and removable from, and replaceable in, said tank, as a unit, a main air-pipe for connection with an air-supply, and branch pipes connecting with said main air-pipe and opening into the several cans for supplying air to the interiors thereof, said main air-pipe and said branch pipes being carried by said battery of cans and movable therewith in the transporting of the cans, said main air-pipe having a plurality of attaching portions to a main air-supply.

12. In ice-making apparatus, the combination of a refrigerating tank, a series of batteries of cans, the cans of each battery being operatively connected together and removable from, and replaceable in, said tank, as a unit, a system of air-pipes carried by each of said batteries and through which air is supplied to the interiors of the cans thereof, said systems of air-pipes being movable with the respective batteries in the transporting of said batteries, each of said systems of air-pipes being provided with a plurality of attaching portions for communication with other pipes, means releasably connecting one of said attaching portions of each of said systems to a source of air under pressure, and a flexible hose leading from a source of air under pressure and adapted for successive attachment to the others of said portions of said systems of air pipes, in succession.

13. In ice-making apparatus, the combination of a refrigerating tank, a series of batteries of cans, the cans of each battery being operatively connected together and removable from, and replaceable in, said tank, as a unit, a system of air-pipes carried by each of said batteries and through which air is supplied to the interiors of the cans thereof, said systems of air-pipes being movable with the respective batteries in the transporting of said batteries, each of said systems of air-pipes being provided with a plurality of attaching portions for communication with other pipes, means releasably connecting one of said attaching portions of each of said systems to a source of air under pressure, and a flexible hose leading from a source of air under pressure and adapted for successive attachment to the others of said portions of said systems of air pipes in succession, and check-valves in said attaching portions.

14. In ice-making apparatus, the combination of a refrigerating tank, a series of batteries of cans, the cans of each battery being operatively connected together and removable from, and replaceable in, said tank, as a unit, a system of air-pipes carried by each of said batteries and through which air is supplied to the interiors of the cans thereof, said systems of air-pipes being movable with the respective batteries in the transporting of said batteries, each of said systems of air-pipes being provided with a plurality of attaching portions for communication with other pipes, means releasably connecting one of said attaching portions of each of said systems to a source of air under pressure, and a flexible hose leading from a source of air under pressure and adapted for successive attachment to the others of said portions of said systems of air pipes, in succession.

15. In ice-making apparatus, the combination of a refrigerating tank, a series of batteries of cans, the cans of each battery being operatively connected together and removable from, and replaceable in, said tank, as a unit, a system of air-pipes carried by each of said batteries and through which air is supplied to the interiors of the cans thereof, said systems of air-pipes being movable with the respective batteries in the transporting of said batteries, each of said systems of air-pipes being provided with a plurality of attaching portions for communication with other pipes, means releasably connecting one of said attaching portions of each of said systems to a source of air under pressure, and a flexible hose leading from a source of air under pressure and adapted for successive attachment to the others of said portions of said systems of air pipes, in succession, valves controlling the flow of air from said air pipes and hose.

16. In ice making apparatus, the combination of refrigerating means, cans in which the ice cakes are to be formed, air pipes located exteriorly of said cans and opening into the latter below the level of water in the cans, and means for supplying air to said air pipes to render the latter free of water during the operations of transporting, dumping and filling the cans and the subjection of said pipes to freezing temperature.

17. In ice making apparatus, the combination of refrigerating means, cans in which the ice cakes are to be formed, air pipes located exteriorly of said cans and permanently connected therewith, and means for supplying air to said air pipes to render the latter free of water during the operations of transporting, dumping and filling the cans and the subjection of said pipes to freezing temperature.

18. In ice-making apparatus, the combination of a refrigerating tank, a can supporting frame movable into and out of the tank, a battery of cans carried by said frame and separately removable therefrom, an air pipe carried by said frame and having branches which open into said cans, respectively, and valves controlling the flow of air into said branches and operable independently of each other to permit of a volume of air sufficient for cleaning out the branch pipes to pass through the latter.

OTTO LUHR.